(12) United States Patent
Kulkarni et al.

(10) Patent No.: US 6,822,064 B1
(45) Date of Patent: Nov. 23, 2004

(54) POLYMERIZABLE MACROMERS AND PREPARATION THEREOF

(75) Inventors: Mohan Gopalkrishna Kulkarni, Pune (IN); Jayant Jagannath Khandare, Pune (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/697,669

(22) Filed: Oct. 29, 2003

(51) Int. Cl.$^7$ .............................................. C08F 220/10
(52) U.S. Cl. ..................... 526/328.5; 526/204; 526/217; 526/288; 526/304; 526/307.3; 526/307.7; 526/318.3; 526/320; 526/328.5
(58) Field of Search ................................ 526/204, 217, 526/288, 304, 307.3, 307.7, 318.3, 320, 328.5

(56) References Cited

U.S. PATENT DOCUMENTS 5,891,862 A * 4/1999 Mandeville et al. .......... 514/54

FOREIGN PATENT DOCUMENTS

DE 102 04 234 A1 * 8/2003
WO WO 98/51694 * 11/1998
WO WO 99/64563 * 12/1999

OTHER PUBLICATIONS

Bahulekar et al. Carbohydrate Polymers (1998), 37(1), 71–78.*
Kim et al. Enzyme and Microbial Technology (1999), 25, 31–37.*
Bentolila et al. Polymers for Advanced Technologies (2000), 11, 377–387.*

* cited by examiner

Primary Examiner—Helen L. Pezzuto
(74) Attorney, Agent, or Firm—Merchant & Gould P.C.

(57) ABSTRACT

The present invention relates to a polymerizable macromers for applications in medicine and biotechnology and synthesis thereof. Macromers comprises polyvalent various carbohydrates including N-Acetyl Glucosamine(NAG) which bind more efficiently to lysozyme than NAG itself. Effective inhibition of lysozyme is possible even at very low ligand concentrations. The polymerizable macromer could be used for prevention and treatment of bacterial and viral infections. Moreover these macromers can be copolymerized with other comonomers to form stimuli sensitive polymers and used for the recovery of biomolecules. The methodology can be extended to other ligands such as sialic acid and used for preventing influenza and/or rotavirus infections.

26 Claims, No Drawings

POLYMERIZABLE MACROMERS AND PREPARATION THEREOF

FIELD OF INVENTION

This invention relates to polymerizable macromers containing carbohydrates including with N-Acetyl Glucosamine (NAG) of molecular weight ranging between 700 Daltons to 1,00,000 Daltons having formula herein below.

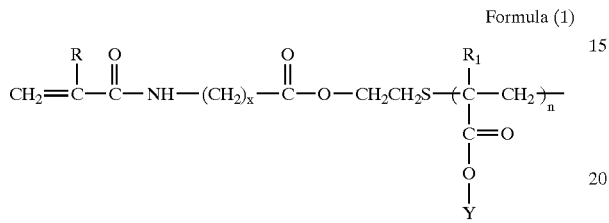

Formula (1)

wherein,

R is H, $CH_3$, $C_2H_5$, $C_6H_5$, $R_1$ is H, $CH_3$, $C_2H_5$, $C_6H_5$

X may be between 4 to 10, n is from 2 to 50

Y may be N-Acetyl Glucosamine (NAG), mannose, galactose, sialic acid, fructose, ribulose, erythrolose, xylulose, psicose, sorbose, tagatose, glucopyranose, fructofuranose, deoxyribose, galactosamine, sucrose, lactose, isomaltose, maltose, cellobiose, cellulose and amylose.

More particularly it relates to the said polymerizable macromers containing various carbohydrate ligands including with NAG and preparation thereof through the specific linkage mentioned herein. Still more particularly it relates to macromer, which bind more strongly to lysozyme than NAG itself.

The macromers of the present invention as mentioned above are prepared by coupling acryloyl-spacer conjugate of formula (2) claimed in our copending Patent Application no NF363/02 entitled "Oligomer and preparation thereof" herein below

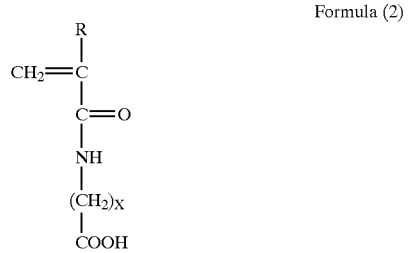

Formula (2)

wherein,

R is H, $CH_3$, $C_2H_5$, $C_6H_5$ X may be between 4 to 10.

with functional polyvalent oligomers comprising NAG, sialic acid, galactose or mannose exemplified with NAG as herein given below having Formula (3)

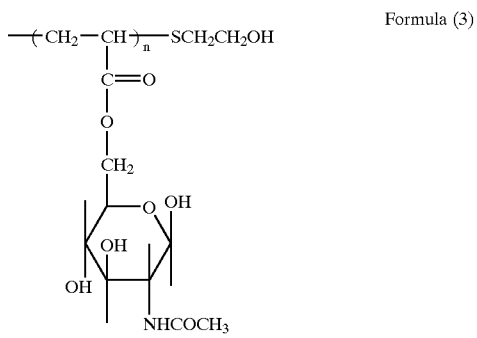

Formula (3)

wherein, n=2 to 50

The polymerizable macromers may be used for inhibition of viral infections and the recoveries of biomolecules. The approach of synthesis of polymerizable macromers with ligand N-Acetyl Glucosamine (NAG) is a generic and can be used for other ligands such as sialic acid, galactose and mannose.

BACKGROUND AND PRIOR ART REFERENCES

Carbohydrates play a crucial role in biological phenomena and therefore these molecules have attracted the attention of chemists and biochemists. These biomolecules are ubiquitous, figuring prominently in various processes such as cell differentiation, cell growth, inflammation, viral and bacterial infection, tumorigenesis and metastasis (Rouhi A., M., C & EN, Sep. 23,62–66,1996).

Many infections caused by bacteria and virus are a result of host receptor interactions. The foremost step for the infection is the adhesion of the ligands present on the infectious microbe to the receptors of the host cells. Adhesion and interactions have to be strong for a successful infection. If the adhesion is not adequate then normal defense mechanism can intercept this process. Viruses and bacteria for example interact with certain saccharides of the host cell. Bacteria express a large number of lectins and are used to adhere to glycocalyx of the host cell through a multivalent interactions. Agglutination of erythrocytes is a case in point.

Carbohydrates exhibit molecular diversity and wide structural variations, which makes carbohydrates alternative ligands for competitive binding to inhibit the infections.

Many alterations and modifications of the naturally occurring O-/N-glycosidic sugars are being reported and is an area of prime interest to the chemist and biochemist.

The importance of carbohydrates in biologically relevant recognition processes has been recognized fairly recently (Feizi, T., Biochem. J. 245:1,1987). In addition, carbohydrates on cell surfaces play an important role in intercellular communication and recognition processes, which is principally based on receptor-ligand interactions.

Carbohydrates are usually attached to other moieties such as lipids or proteins. Belvilacqua et al., (Science, 243:1160, 1989) have demonstrated the role of carbohydrates along with proteins and nucleic acids as a primary biological information carriers.

The inventors of the present invention have observed that it may be worthwhile to use carbohydrates in therapeutics for human, especially since they can play an important role in prevention of viral and bacterial infections. Recently few reports have been published to justify the use of carbohydrates. Krepinsky et al. (U.S. Pat. No. 6,184,368, 2001) suggested the application of carbohydrates in preventing the infections. Mandeville, et al. (U.S. Pat. No. 5,891,862,1999) reported the use of polyvalent polymers containing carbohydrates for the treatment of rotavirus infection Polyvalent molecules bind to the receptor molecules through multiple contacts, which results in strong binding. However the synthesis of ligands is critical and involves multiple steps. The polyvalent interactions can be maximized by incorporation of ligands optimally tailored based on the understanding of the binding between the ligand and the host receptor. The enhanced interactions are important especially when the ligands are expensive e.g. sialic acid.

The inventors of the present invention have also observed that interactions of ligand with a receptor can be enhanced by 1) appropriate incorporation of the ligand 2) incorporation of spacer chain and 3) by steric stabilization/exclusion.

Spaltenstein et al., (J.Am.Chem.Soc.,113:686,1991) reported increased interaction between the receptor and ligand due to plurality of binding ligands and the receptors on the host surface. This was illustrated by the influenza virus hemagglutinin, which binds to neuraminic acid on the cell surface, which has a greater affinity for its receptor when a polyvalent structure is presented.

The early phase of infection by viral, parasitic, mycoplasmal and bacterial pathogens, is achieved by specific adhesion to cell surface carbohydrate epitopes (Dimick,et al. (J.Am.Chem.Society, 121,10286–10296,1999). Dwek, et al. (Chem. Rev., 96,693, 1996) reported the initiation of a wide range of human disease is mediated by protein-carbohydrate recognition step.

If relative density and spatial arrangement of ligands incorporated is optimized, then the binding can be substantially enhanced. The enhanced interaction between molecular conjugate with a specific binding site of biomolecule also finds applications in affinity separations, drug delivery and biotechnology.

To imitate and exploit this mechanism there is a need to devise a simple synthetic methodology, which will enhance substrate ligand interactions.

Design of high affinity protein carbohydrate binding systems can provide an alternative strategy for the treatment of infectious diseases e.g. influenza and rotavirus. This has the advantage as such agents will not have pathogen resistance to antibiotics and drugs. A new approach to treat influenza is based on the principle of inhibition of virus to the host cells. The inhibitors like sialic acid anchored to polymeric or liposomal carriers have been reported in the past.

Since monovalent interactions of natural oligosaccharides are weak, they need to be used in large quantities for an effective treatment. This problem can be overcome by synthesizing polyvalent carbohydrate molecules (Zopf, D., Roth, S. Lancet 347, 1017, 1996). The concept is attractive since it would provide a non-toxic therapeutic to a wide range of human diseases. But synthesis of such compounds is critical and requires knowledge of the host-cell binding mechanism.

Polymeric ligands that bind to the virus more powerfully than the Red Blood Cells will prevent the influenza infection. Similar binding is also involved in rotavirus infections. (Mandeville et al. U.S. Pat. No. 6,187,762, 2001)

Advantage of carbohydrate modification lies in that it may impart change in physical characteristics such as solubility, stability, activity, antibody recognition and susceptibility to enzyme. Sharon, et al., (Science,246:227–234,1989) reported carbohydrate portions of glyco-conjugate molecules to be important entity in carbohydrate biology.

Haemagglutination can be prevented by saccharides multivalent glycoconjugates, which bind to the bacterial lectins and thus inhibit bacterial adhesion. (Sigal, et al., J.Am.Chem.Soc.118:16,3789–3800,1996).

Damschroder, et al. (U.S. Pat. No. 2,548,520,1951) reported high molecular weight preformed polymers conjugated with unsaturated monomers or proteins. Synthesis of high molecular weight materials of this kind generally requires temperatures up to 100° C. Such high temperatures are not well tolerated by most of the proteins as they are thermolabile. Thus the methods described are unsuitable for producing polymers of biologically active molecules.

Carbohydrates can be used as functionalized ligands by incorporation into polymer or macromer backbone. The macromer containing polyvalent ligand can be homopolymerized or copolymerized with suitable monomer to form a multivalent conjugate. Multivalent ligand may include shorter oligomers having pendant functional groups that may impart desirable properties to the polymer.

The present invention involves coupling of oligomers comprising NAG and bearing terminal functional groups adequately described and covered in our copending patent application no. NF 363/02 entitled "Oligomer and preparation thereof" with polymerizable monomers containing vinyl unsaturation optionally containing a spacer to yield a macromers. We have demonstrated that macromers bind to lysozyme more strongly as evidenced by values of $K_b$ and inhibit lysozyme more efficiently as evidenced by values of $I_{50}$.

Multivalent macromers of varied length and density will be useful for receptor ligand interactions of biological origin. Various chemical and chemoenzymatic methods have been reported in the past for the preparation of di and trivalent ligands, dendrimers, and high molecular weight polymers but have proven to be complicated to synthesize.

Thus, there is necessity of a simple methodology to obtain multivalent ligands and polymers of varying chain length.

Mammen, M., and Whitesides, G., M., demonstrated that (J.Med.Chem.38:21,4179–90,1995) agglutination of erythrocytes caused by influenza virus could be prevented by use of polyvalent sialic acid inhibitor. Moreover, they suggested two favorable mechanisms for inhibition between the surfaces of virus and erythrocytes 1) high-affinity binding through polyvalency, and 2) steric stabilization. This novel approach is a model for pathogen-host interactions.

Sigal, et al. (J.Am.Chem.Soc.118:16,3789–3800,1996) prepared polymers containing sialoside and evaluated the efficiency of inhibition of influenza virus in terms of inhibition constants ($K_i$). Although the authors observed that the extent of inhibition and minimum inhibition concentration decreased with increase in polymer molecular weight and sialic acid content, it was also noted that not all sialic acid ligands were involved in binding with the virus. This clearly indicates need of tailoring the polymer structure so that higher fraction of ligands is involved in binding.

Spevak et al. (J. Am. Chem. Soc., 115,1146–1147, 1993) reported the polymerized liposomes containing C-glycosides of sialic acid, which were potent inhibitors of influenza virus. Moreover the authors demonstrated that the infection was inhibited more effectively when the ligand bearing monomer was polymerized.

Various methods have been reported in the past to synthesize multivalent ligands such as Ring-Opening Metathesis Polymerization (ROMP). ROMP has been used to generate defined, biologically active polymers by Gibson et al., (Chem. Comm., 1095–1096,1997) and Biagini et al., (Polymer, 39, 1007–1014 ,1998).

Carbohydrate receptors also have a role in intracellular trafficking of macromolecules. Therefore, macromolecules containing suitable ligands find applications in biomedical field for e.g. in targeting of drugs to certain tissues and cells in the organisms.

Recent advancements in the field of glycoscience have demonstrated enhanced binding between carbohydrate ligands and specific receptors as a result of the cluster effect. These interactions are result from intrinsic properties of such ligands. Various methods have been reported in the past for the synthesis of glycoconjugate oligomers and the clusters for the receptor binding activity. Nishimora, et al. (Macromolecules, 27, 4876–4880,1994) synthesized sugar homopolymer clusters from acrylamidoalkyl glycosides of N-Acetyl-D-Glucosamine. On addition of the polymer clusters, binding to WGA was enhanced.

The polyvalent interactions have several advantages over monovalent interactions as a result of mode of receptor binding. Moreover, multivalent interactions lead to conformational contact with biological receptors, which subsequently results in enhanced interaction with the substrate.

Previous methods of synthesis of polyvalent ligands are complicated and need higher inhibition concentrations. It is reported that the polymeric fucosides are resistant to neuraminidase enzyme present on the surface of influenza virus. The viruses also cleave sialic acid groups from molecules that bind to the surface of the virus, and thereby destroy the binding ability.

The polymerizable macromers reported by the inventors of the present invention are effective at very low concentration which is a significant advantage when the ligands under consideration are expensive e.g. sialic acid. Further, these macromers can be copolymerized with other comonomers to provide copolymers containing polyvalent ligands. Moreover, the process reported here for the incorporation of polyvalent ligands into polymerizable macromers is relatively simple and involves lesser steps.

The polymerizable macromers are of suitable molecular weights, which can efficiently bind to the target site.

The ligands on the polymerizable macromers have ability to bind to various substrate molecules simultaneously. It is expected that the presence of multiple ligands in the backbone can enhance binding to the viruses and biomolecules. Thus the polymerizable macromer containing multiple ligands at low concentration are utilized and can potentially interact with multiple receptors thereby enhancing the inhibition.

OBJECTIVE OF INVENTION

The object of the present invention therefore is to prepare polymerizable macromers comprising polyvalent NAG, which exhibit multivalent interactions and simple and novel process for the preparation thereof. The merits of the approach have been highlighted using NAG as an illustration.

Another object is to provide polymerizable macromers which are more effective in binding with the lysozyme as evidenced by the values of the binding constants $K_b$ and relative inhibition of lysozyme more effectively as evaluated by the values of $I_{50}$.

Yet another object is to provide polymerizable macromers for applications in medicine and biotechnology.

Yet another object is to provide a convenient process of preparation of polyvalent ligand NAG, mannose, galactose or sialic acid, fructose, ribulose, erythrolose, xylulose, psicose, sorbose, tagatose, glucopyranose, fructofuranose, deoxyribose, galactosamine, sucrose, lactose,. isomaltose, maltose, cellobiose, cellulose and amylose.

Another object is to provide a convenient process of preparation of polymerizable macromers, in the form of monomers containing Acryloyl, Methacryloyl or Para Vinyl Benzoyl (PVB) moieties.

Yet another object is to provide a convenient process of incorporation of spacer arm to a polymerizable monomer.

Yet another object is to provide a convenient process of conjugation of polymerizable monomer containing a spacer arm and polyvalent ligand.

Yet another object is to provide a process of preparation of polymerizable macromers containing NAG ligands for enhanced interactions.

Still another object is to provide more stable ligands for the interactions with biomolecules than the natural polymers such as chitin and chitosan containing natural ligand NAG.

Therefore, the objective of the present work is to provide polymerizable macromers containing polyvalent ligand for enhanced interactions with the substrates and the process for the preparation thereof.

Chitosan is a linear, binary heteropolysaccharide and consists of 2-aceta amido-2-deoxy-βD-glucose (GlcNAc; A-unit) and 2-amino 2-deoxy-β-D-glucose (GIcNAc, D-unit). The active site of lysozyme comprises sub-sites designated A–F. Specific binding of chitosan sequences to lysozyme begins with binding of the NAG units in the subsite C. Moreover, there is a need to synthesize ligands similar to repeat units of chitosan which will not be hydrolyzed by lysozyme. Moreover natural ligands derived from glucose are susceptible to microbial growth. The polymerizable macromers reported here are stable than chitin and chitosan reported earlier.

In our copending application No. NF 363/02 entitled "Oligomer and preparation thereof" we have shown that the oligomers of NAG in which the NAG groups are juxtaposed to one another, bind more effectively to lysozyme as reflected in values of binding constant ($K_b$) and the inhibition concentrations $I_{50}$.

The present invention provides polymerizable macromers containing NAG for a biomolecular target and method for preparation thereof.

The macromers reported here can be homopolymerized or copolymerized with suitable monomers. The approach described to prepare polyvalent carbohydrate macromer containing NAG ligands is simple and can be used to synthesize other macromeric ligands such as sialic acid which bind to influenza virus and rotavirus. Such macromeric ligands may be even used as antiinfective agents both for prevention and treatment of diseases. Moreover, macromers containing NAG can be anchored to thermoprecipitating polymers that can be used for the recovery of biomolecules such as lysozyme and lectins.

The polymerizable polyvalent macromers provided by the present invention can be used for application in recoveries of biomolecules.

The macromers comprising monomer conjugated with polyvalent ligands may also further be used in the treatment of bacterial or viral infections, and are expected not to cause drug resistance.

The approach described herein is a generic one and can be extended to other systems as well for example sialic acid.

SUMMERY OF THE INVENTION

The present invention provides process for the preparation of polymerizable macromers containing polyvalent N-Acetyl Glucosamine. The macromers contain polymerizable monomer conjugated to spacer arm covalently bonded to the polyvalent ligand. The macromers reported in this invention provide improved binding and inhibition even at low concentration. Macromers can be used for prevention of viral infections and recoveries of biomolecules.

DETAILED DESCRIPTION OF THE INVENTION

The present invention relates to a process for preparation of Polymerizable macromer of molecular weight ranging between 700 Daltons to 1, 00,000. Daltons having formula (1)

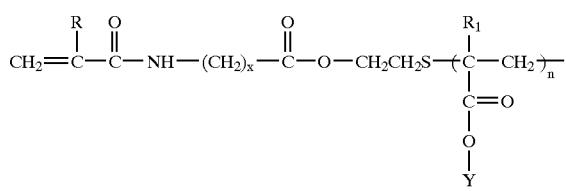

Formula (1)

wherein,

R is H, $CH_3$, $C_2H_5$, $C_6H_5$, $R_1$ is H, $CH_3$, $C_2H_5$, $C_6H_5$

X is in the range of 4 to 10 and value on n is in the range of 2 to 50,

Y is N-Acetyl Glucosamine(NAG), mannose, galactose, sialic acid, fructose, ribulose, erythrolose, xylulose, psicose, sorbose, tagatose, glucopyranose, fructofuranose, deoxyribose, galactosamine, sucrose, lactose, isomaltose, maltose, cellobiose, cellulose and amylase, said process comprising following steps:

a) dissolving a Polymerizable monomer-spacer conjugate in an organic solvent, b) adding to the solution of step (a) one or more functional oligomer, c) adding coupling agent to step (b) reaction mixture to dissolve, d) allowing to stand the reaction mixture of step (c) at an ambient temperature for 24 hrs to 48 hrs, e) removing the unreacted coupling agent from step (d) reaction mixture, and f) precipitating the Polymerizable macromer from step (e) reaction mixture by adding a non solvent.

In one of the embodiment of the present invention the monomer spacer conjugate has general formula (5) as given below which has been claimed in our co-pending application No. NF 363/02 entitled "Oligomer and preparation thereof"

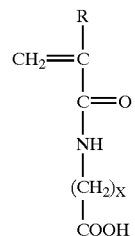

Formula (5)

Where in, R is H, $CH_3$, $C_2H_5$, $C_6H_5$. X may be between 4 to 10.

In another embodiment of the present invention the monomer-spacer conjugate is having a reactive site for bonding exemplified by COOH or $NH_2$ In yet another embodiment of the present invention the organic solvent is selected from the group consisting of dimethyl formamide, tetra hydro furan or di-methyl sulfoxide used to dissolve the monomer-spacer conjugate and functional oligomer In still another embodiment of the present invention the functional oligomer used is selected from polymethacryloyl NAG or polyacryloyl NAG or poly vinyl benzyl NAG.

In still further embodiment of the present invention the coupling agent used is selected from the group consisting di Cyclohexyl Carbodiimide (DCC), 1-Cyclohexyl 3-(2-Morpholinoethyl) Carbodiimide metho-p-toluenesulfonate (CMC), 1-Ethyl-3-(3-Dimethylamino-propyl) Carbodiimide (EDC).

In another embodiment of the present invention the molar ratio of coupling agent to functional oligomer used is minimum 1:1 for condensation of polymerizable monomeric spacer conjugate.

Yet another embodiment of the present invention the non solvent used to precipitate the polymerizable macromers is selected from the group consisting of acetone, diethyl ether or hexane.

Yet another embodiment of the present invention polymerizable macromer along with NAG enhances the binding constant $K_b$ 930 times higher than NAG alone.

Yet another embodiment of the present invention polymerizable macromer reduce inhibition of lysozyme $I_{50}$ mM more than 27000 times Yet another embodiment of the present invention binding ($I_{max}$) of Polymerizable macromer enhances in the range of 55 to 95.

A still further embodiment of the present invention of a polymerizable macromer as obtained by said process comprises multiple ligands.

A further embodiment of the present invention polymerizable macromers containing ligands reported herein are effective at very low concentration, which is advantage when the ligands under consideration are expensive e.g. sialic acid.

Yet another embodiment of the present invention of a polyrnerizable macromer as obtained by said process comprises multiple ligands with various carbohydrates including NAG.

Yet another embodiment of the present invention multiple ligand contains NAG are stable, water soluble, resistant to degradation and free from microbial contamination which is an advantage over the natural polymers such as chitin and chitosan.

Yet another embodiment of the present invention wherein multiple ligands bind simultaneously multiple sites of the enzyme and disease causes virus thereby enhancing inhibitory effect.

Yet another embodiment of the present invention wherein polymerizable macromer containing multiple ligand interact with multiple receptors to enhance the binding of lysozyme or virus and biomolecules and thereby enhancing the inhibition.

Yet another embodiment feature of the present invention to provide more stable polymerizable macromers for the interactions with biomolecules than the natural polymers such as chitin and chitosan containing N-Acetyl Glucosamine Yet another embodiment of the present invention comprises conjugation of the monomeric spacer with polyvalent ligand to provide greater accessibility to the ligand conjugate for binding with receptor molecule.

Still another embodiment of the present invention wherein polymerizable macromer copolymerized with the co-monomers and provide copolymers containing polyvalent ligand.

Still another embodiment of the present invention wherein polymerizable macromer used in selective separation of biomolecules from solution by virtue of their ability to bind selectively to the substrate.

Still another embodiment of the present invention wherein the molecular weight of the polymerizable macromer is in the range of 700 Daltons to 1,00,000 Daltons.

Yet another embodiment of the present invention wherein polymerizable macromer useful for application in medicine and biotechnology.

Yet another embodiment of the present invention wherein polymerizable macromer used in threapeutical agents, in affinity separations and immunoassays.

Yet another embodiment of the present invention presence of multiple ligands in the polymer backbone will enhance binding to the virus and biomolecules such as influenza virus, rotavirus, and wheat germ agglutinin.

Yet another embodiment of the present invention of the polymerizable macromers containing NAG in the form of polyvalent oligomers are more efficient than NAG itself evidenced by higher values of $K_b$ and lower values of $I_{50}$.

Yet another embodiment of the present invention is the method used for estimation of the relative inhibition in terms of $I_{50}$ mM and $I_{max}$ mM values.

In yet another embodiment of the present invention the binding constant ($K_b$) between lysozyme and the functional polyvalent polymer containing NAG is estimated using a fluorescence method.

Yet another embodiment of the present invention wherein polymerizable macromer has binding constant value $K_b$ 930 times higher as compared to N-Acetyl Glucosamine.

Yet another embodiment of the present invention wherein polymerizable macromer having inhibition of lysozyme in terms of $I_{50}$mM more than 27000 times lower as compare to N-Acetyl Glucosamine.

Yet another embodiment of the present invention wherein polymerizable macromer having inhibition of lysozyme in terms of $I_{max}$ 70 times higher as compared to N-Acetyl Glucosamine.

EXAMPLES

The process for the preparation of the polymerizable macromers of the present invention is described herein below with reference to examples which are illustrative only and should not be construed to limit the scope of the present invention in any manner whatsoever.

Example 1

This example describes the process for the preparation of Methacryloyl 6-Amino Caproic Acid (M.Ac.6-ACA) 250 ml capacity beaker was equipped with dropping funnel and pH meter. 13.16 gm 6ACA, 4 gm. sodium hydroxide and 80 ml. water was stirred continuously at 5° C. on a magnetic stirrer. Nine milliliter of Methacryloyl Chloride in 10 ml dichloromethane was added drop wise to the above solution. The pH of reaction mixture was maintained at 7.5 by the addition of 10 M NaOH solution. Unreacted acid chloride was extracted in 100 ml ethyl acetate. The clear aqueous solution was acidified to pH 5.0 using concentrated HCl and the product was extracted in ethyl acetate (3×100 ml). The organic layer was dried on anhydrous sodium sulfate and concentrated under vacuum. The viscous liquid was added to 500 ml petroleum ether. The solid product was obtained and vacuum dried for 48 hrs.

Example 2

This example describes the process for the preparation of Macromers: Acryloyl 6-Amino Caproyl poly. Acryloyl N-Acetyl Glucosamine (Ac. 6 ACA.P.Ac.NAG) Ac.6 Amino Caproic Acid (0.122 gm.,0.00066 M) and P. Ac. N-Acetyl Glucosamine (2 gm,0.00066 M)were taken in a 100 ml flask, DMF(25 ml) was added and stirred continuously to obtain a clear mixture. Di Cyclohexyl Carbodiimide (0.136 gm, 0.00066 M) was first dissolved in DMF (5 ml) and added to the mixture dropwise. It was stirred continuously for 24 hrs. at room temperature. DCU was filtered off and the macromer was precipitated in acetone, and vacuum dried.

Example 3

This example describes estimation of binding constant ($K_b$) of monomers, oligomers, and macromers containing NAG incorporated as monomer and macromer by fluorescence spectrophotometric method and the enhancement resulting from conjugation with monomers and monomer containing spacer. The Binding constant $K_b$ is a measure of affinity between the ligand containing NAG and lysozyme and does not include the steric contribution.

Fluorescence spectra of lysozyme were recorded on a Perkin Elmer LS-50 B luminescence spectrophotometer. Excitation frequency was 285 nm. Solutions of lysozyme and N-Acetyl Glucosamine were prepared in 0.066 M phosphate buffer pH 6.2, containing 0.0154 M sodium chloride and 0.008 M sodium azide. 0.1 milliliter of lysozyme 80 μg /ml was mixed with solution containing different ligand concentration in a 2 ml capacity 10 mm square quartz cells maintained at 18° C. Phosphate buffer was added to make the volume to 2 ml. The fluorescence intensities of the solutions were measured, relative to the solutions containing enzymes and buffer mixtures of the identical concentrations reference. The relative fluorescence intensity of lysozyme saturated with solution containing different ligand concentration, F∝, was extrapolated from the experimental values by plotting $1/(F_0-F)$ against $1/[S]$ where F is the measured fluorescence of a solution containing enzyme with given substrate concentration [S] and $F_o$ is the fluorescence of the solution of enzyme alone (Chipman et al., J. Biol. Chem., 242-19, 4388–4394,1967).

The highest concentration of polymer substrates was used when enzyme was saturated more than 85%.

TABLE 1

Binding Constants ($K_b$) for Monomers, Oligomers and Macromers Containing NAG

|  | Mol. Wt. | $K_b$ |
|---|---|---|
| NAG | 221 | $5.24 \times 10^2$ |
| Ac. NAG | 275 | $7.07 \times 10^4$ |
| P Ac. NAG | 638 | $5.3 \times 10^5$ |
| P Ac. NAG | 1315 | $2.51 \times 10^5$ |
| P Ac. NAG | 2631 | $4.4 \times 10^5$ |
| Ac. 6-ACA. P. Ac. NAG(Macromer) | 823 | $5.62 \times 10^5$ |

The binding constant for oligomers and macromers are summarized in Table 1 wherein oligomer of molecular weight has binding constant $5.3 \times 10^5$, which shows 988 folds enhancement to NAG ($5.24 \times 10^2$)

On incorporation of spacer and polyvalent oligomer the binding constant for macromers is increased to $5.62 \times 10^5$, almost 930 times compared to N-Acetyl Glucosamine.

Example 4

This example describes the estimation of inhibition of lysozyme by monomers, oligomers and macromer. $I_{50}$ denotes the concentration of the ligand containing NAG at which 50% of the highest achievable inhibition is achieved. $I_{max}$ denotes the ligand concentration at which the maximum inhibition is achieved.

*Micrococcus lysodeikticus* is a substrate for the enzyme lysozyme. Relative binding of macromers was estimated by using a procedure reported by Neuberger and Wilson (1967).

1.5% w/v stock solutions of macromer was prepared in 0.0066 M phosphate buffer pH 6.2 containing 0.0154 m sodium chloride and 0.008 M sodium azide. One milliliter of stock solution containing different ligand concentration was mixed with 1.6 ml of 78 μg/ml of *Micrococcus lysodeikticus* in a 3-ml capacity glass cuvette. The mixture was incubated for 5 minutes at 20° C. To this mixture 0.1 ml of lysozyme (27 μg/ml) was added and mixed thoroughly. The relative absorbance at 450 nm ($\Delta_{450}$) was recorded for 30 seconds. A blank reading without the ligand was noted and the change in the absorbance per second was calculated. Then relative inhibition was calculated.

TABLE 2

Estimation of Relative Inhibition of Lysozyme by Monomers, Oligomers and Macromers Containing NAG

|  | Mol. Wt. | $I_{50}$ mM | $I_{max}$ | $I_{max}$ mM |
|---|---|---|---|---|
| NAG | 221 | 74.00 | 55.29 | 92.50 |
| Ac. NAG | 275 | 14.81 | 50.00 | 14.81 |
| Ac. 6 ACA. NAG | 404 | 0.035 | 52.50 | 0.036 |
| P Ac. NAG | 638 | 0.0026 | 89.30 | 0.0043 |
| P Ac. NAG | 1315 | 0.0016 | 73.43 | 0.0042 |
| P Ac. NAG | 2631 | 0.0014 | 73.00 | 0.0021 |
| Ac. 6 ACA. PAc. NAG (Macromer) | 823 | 0.0026 | 94.10 | 0.0036 |

The relative inhibition of lysozyme in terms of $I_{50}$ has decreased to 0.0026 for oligomer of molecular weight 638 and is almost 28000 folds lower to NAG. The inhibition for macromer is 0.00268 mM, which shows more than 27,000 folds decrease to NAG (74 mM).

The $I_{max}$ increased from 55.29 to 94.1 (Table 2).

The advantages of the present invention are as follows:
1. The polymerizable macromers reported here comprise polyvalent ligands and exhibit enhanced interactions.
2. In addition such ligands have higher molecular weight and demonstrate greater efficiency through steric exclusion.
3. The polymerizable macromers have greater water solubility, stability, and susceptibility to enzyme from hydrolysis.
4. The enhancement in binding due to polyvalent interactions arise from the conformational flexibility of the polyvalent oligomers with the biological receptors.
5. The method of preparation of polymerizable macromers containing polyvalent ligands is simple.
6. The polymerizable macromers containing polyvalent NAG are effective even at low ligand concentration than monomer itself.
7. The polymerizable macromers contain functional reactive groups and can be copolymerized with other comonomers.
8. The polymerizable macromers can bind simultaneously to multiple binding sites of biomolecules thereby exhibiting enhanced interactions.

What is claimed is:

1. A process for preparation of Polymerizable macromer of molecular weight ranging between 700 Daltons to 1,00,000 Daltons having formula (1)

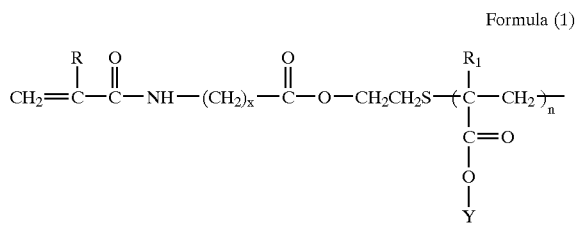

Formula (1)

wherein,

R is H, $CH_3$, $C_2H_5$, $C_6H_5$, $R_1$ is H, $CH_3$, $C_2H_5$, $C_6H_5$

X is in the range of 4 to 10 and value on n is in the range of 2 to 50,

Y is N-Acetyl Glucosamine(NAG), mannose, galactose, sialic acid, fructose, ribulose, erytbrolose, xylulose, psicose, sorbose, tagatose, glucopyranose, fructofuranose, deoxyribose, galactosamine, sucrose, lactose, isomaltose, maltose, cellobiose, cellulose and amylase, said process comprising following steps:
   a) dissolving a Polymerizable monomer-spacer conjugate in an organic solvent,
   b) adding to the solution of step (a) one or more functional oligomer,
   c) adding coupling agent to step (b) reaction mixture to dissolve,
   d) allowing to stand the reaction mixture of step (c) at an ambient temperature for 24 hrs to 48 hrs,
   e) removing the unreacted coupling agent from step (d) reaction rnixture, and
   f) precipitating the Polymerizable macromer from step (e) reaction mixture by adding a non solvent.

2. A process as claimed in claim 1 wherein in step (a), the monomer-spacer has general formula formula (5)

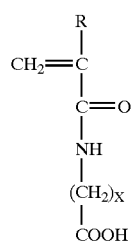

Formula (5)

Where in, R is H, $CH_3$, $C_2H_5$, $C_6H_5$, X may be 4 to 10.

3. A process as claimed in claim 1 wherein in step (a), the monomer-spacer conjugate is having a reactive site for bonding exemplified by COOH or $NH_2$.

4. A process as claimed in claim 1 wherein in step (a), the organic solvent is selected from the group consisting of dimethyl formamide, tetra hydro furan or di-methyl sulfoxide used to dissolve the monomer-spacer conjugate and functional oligomer.

5. A process as claimed in claim 1 wherein in step (b), the functional oligomer used is selected from polymethacryloyl NAG or polyacryloyl NAG or poly vinyl benzyl NAG.

6. A process as claimed in claim 1 wherein in step (c), the coupling agent used is selected from the group consisting di Cyclohexyl Carbodiimide (DCC), 1-Cyclohexyl 3-(2-Morpholinoethyl) Carbodiimide metho-p-toluenesulfonate (CMC), 1-Ethyl-3-(3-Dimethylamino-propyl) Carbodlimide (EDC).

7. A process as claimed in claim 1 wherein in step (c), the molar ratio of coupling agent to functional oligomer used is minimum 1:1 for condensation of polymerizable monomeric spacer conjugate.

8. A process as claimed in claim 1, wherein the molar ratio of coupling agent to functional oligpmer used is in the ratio of 1:1 for condensation of polymerizable monomeric spacer conjugate.

9. A process as claimed in claim 1 wherein in step (f), the non solvent used to precipitate the polymerizable macromers is selected from the group consisting of acetone, diethyl ether or hexane.

10. A process as claimed in claim 1 wherein polymerizable macromer along with NAG enhances the binding constant $K_b$ 930 times higher than NAG alone.

11. A process as claimed in claim 1, wherein polymerizable macromer reduce inhibition of lysozyme $I_{50}$ mM more than 27000 times.

12. A process as claimed in claim 1, wherein binding ($I_{max}$) of Polymerizable macromer enhances in the range of 55 to 95.

13. A Polymerizable macromer as obtained by process as claimed in claim 1, wherein comprises multiple ligand.

14. A Polymerizable macromer as obtained by process as claimed in claim 1, wherein multiple ligands contains various carbohydrates including NAG.

15. A Polymerizable macromer as obtained by process as claimed in claim 1, multiple ligand contains NAG are stable, water soluble, resistant to degradation and free from microbial contamination.

16. A Polymerizable macromer as obtained by process as claimed in claim 1, wherein multiple ligand bind simultaneously multiple sites of the enzyme and disease causing virus thereby enhancing inhibitory effect.

17. A Polymerizable macromer as obtained by process as claimed in claim 1, wherein polymerizable macromer containing multiple ligand interact with multiple receptors to enhance the binding of lysozyme or virus and biomolecules and thereby enhancing the inhibition.

18. A Polymerizable macromer as obtained by process as claimed in claim 1, comprises conjugation of the monomeric spacer with polyvalent ligand to provide greater accessibility to the ligand conjugate for binding with receptor molecule.

19. A Polymerizable macromer as obtained by process as claimed in claim 1, copolymerize with the co-monomers and provide copolymers containing polyvalent ligand.

20. A Polymerizable macromer as obtained by process as claimed in claim 1, used in selective separation of biomolecules from solution by virtue of their ability to bind selectively to the substrate.

21. A Polymerizable macromer as obtained by process as claimed in claim 1, wherein the molecular weight of the polymerizable macromer is in the range of 700 Daltons to 1,00,000 Daltons.

22. A Polymerizable macromer as obtained by process as claimed in claim 1, useful for application in medicine and biotechnology.

23. A Polymerizable macromer as obtained by process as claimed in claim 1, used in threapeutical agents, in affinity separations and immunoassays.

24. A Polymerizable macromer as obtained by process as claimed in claim 1, has binding constant value $K_b$ 930 times higher as compared to N-Acetyl Glucosamine.

25. A Polymerizable macromer obtained by process as claimed in claim 1, having inhibition of lysozyme in terms of $I_{50}$mM more than 27000 times lower as compare to N-Acetyl Glucosamine.

26. A Polymerizable macromer obtained by process as claimed in claim 1, having inhibition of lysozyme in terms of $I_{max}$ 70 times higher as compared to N-Acetyl Glucosamine.

* * * * *